United States Patent [19]

von Ramm et al.

[11] Patent Number: 4,694,434

[45] Date of Patent: Sep. 15, 1987

[54] THREE-DIMENSIONAL IMAGING SYSTEM

[76] Inventors: Olaf T. von Ramm, 3433 Dover Rd., Durham, N.C. 27707; Stephen W. Smith, 742 Owens St., Rockville, Md. 20850

[21] Appl. No.: 619,899

[22] Filed: Jun. 12, 1984

[51] Int. Cl.$^4$ .................. G01N 29/04; A61B 10/00
[52] U.S. Cl. ............................ 367/7; 73/626; 310/720; 367/110; 367/113
[58] Field of Search ............. 367/7, 71, 72, 113, 367/110; 364/522; 73/602, 603, 606, 626; 128/660; 340/701, 720; 343/5 CD

[56] References Cited

U.S. PATENT DOCUMENTS

| | | | |
|---|---|---|---|
| 4,030,343 | 6/1977 | Lund et al. | 73/626 |
| 4,145,680 | 3/1979 | Smith | 73/626 |
| 4,156,304 | 5/1979 | Lee | 73/626 |
| 4,381,675 | 5/1983 | Roberts et al. | 73/606 |
| 4,412,544 | 11/1983 | Beretshy et al. | 73/620 |
| 4,489,729 | 12/1984 | Sorensen et al. | 73/626 |
| 4,499,771 | 2/1985 | Roberts et al. | 73/626 |
| 4,541,435 | 9/1985 | Saita et al. | 73/626 |
| 4,550,607 | 11/1985 | Masleh et al. | 73/626 |
| 4,596,145 | 6/1986 | Smith et al. | 73/626 |

OTHER PUBLICATIONS

Nagata, "How to Reinforce Perception . . . Pictures", 10/3/83, pp. 239–246, 3rd Intern. Disc. Research Conf., vol. 25, #3 Abst. Supplied.
Magee, et al, "Determining Vanishing Points . . . , 12/29/83, pp. 212–216, vol. 1, Proc. Int. Conf. a Lysts., Man . . . " India.
Canteloup et al, "Ultrasonic Visualization . . . Defects", pp. 50, 52, 53., Qualite Rev. Prat. Controle, Ind., vol. 19, #104.

Primary Examiner—Nelson Moskowitz
Attorney, Agent, or Firm—Lalos & Keegan

[57] ABSTRACT

An acoustic pulse echo imaging system capable of producing an image of a three-dimensional object utilizing a two-dimensional display having perspective capabilities is described. In the system angular relationships of targets at all ranges are maintained for display. The system uses a two-dimensional transducer array of piezoelectric elements; the array is steered to assume transmit and receive orientations in both azimuth and elevation by producing (1) a directed transmit pulse and many similarly directed receive orientations or (2) a non-directed transmit pulse and many directed receive orientations. For each transmit pulse a parallel processing system produces several unique image points whose locations in the image correspond to the tangents of the angles of the receive orientations in the azimuth and elevation planes. The brightness of each image point is the weighted integral of the echo data received along each receive path. As an option, range discrimination capability is provided by means of a range dependent gain control, brightness shading as a function of range or a color display in which data originating from different ranges is displayed in different hues.

10 Claims, 17 Drawing Figures

FIG. 10.

| ADDRESS | | | |
|---|---|---|---|
| 0 | TRANSMIT LINE # 1, Tx DATA, 128 BITS | | SCALER, 12LSB |
| 1 | Rx DATA, FOCAL ZONE # 1, 384 BITS | | |
| 2 | Rx DATA, FOCAL ZONE # 2, 384 BITS | | |
| 3 | Rx DATA, FOCAL ZONE # 3, 384 BITS | | |
| 15 | Rx DATA, FOCAL ZONE # 15, 384 BITS | | |
| | 44 | | |
| 4081 | TRANSMIT LINE # 256, Tx DATA, 128 BITS | | SCALER, 12LSB |
| 4082 | Rx DATA, FOCAL ZONE # 1, 384 BITS | | |
| 4083 | Rx DATA, FOCAL ZONE # 2, 384 BITS | | |
| 4084 | Rx DATA, FOCAL ZONE # 3, 384 BITS | | |
| 4095 | Rx DATA, FOCAL ZONE # 15, 384 BITS | | |

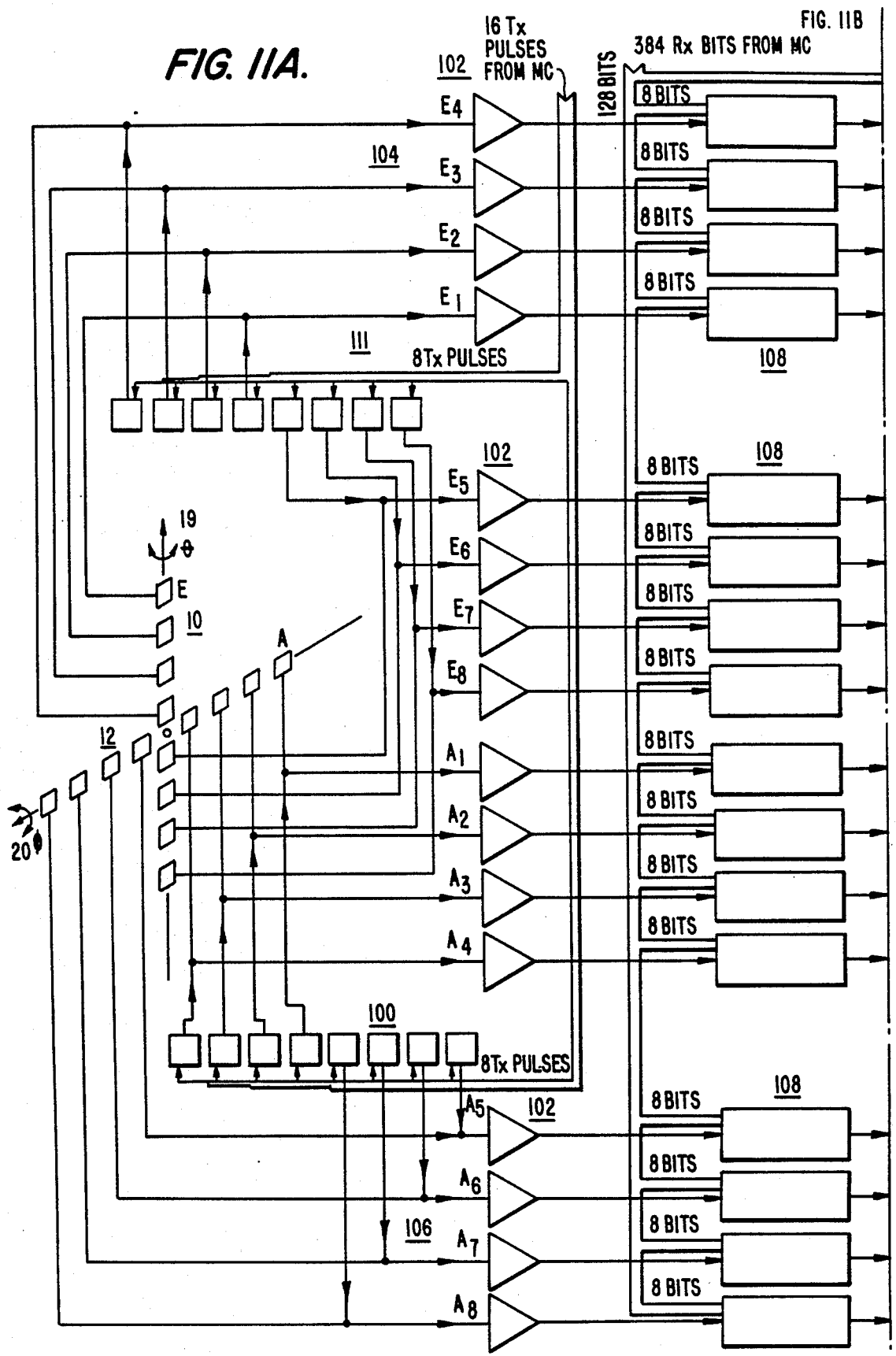

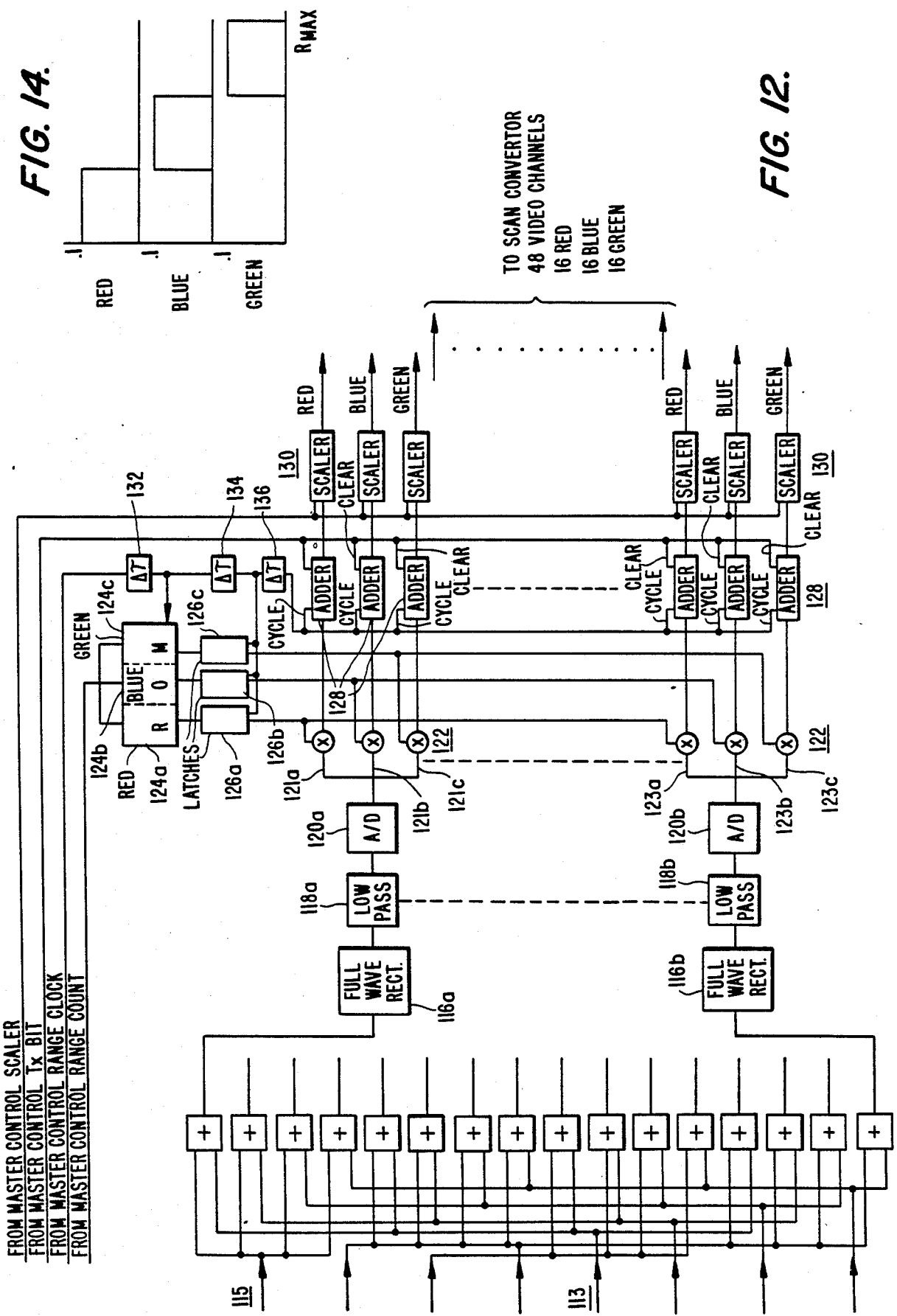

THREE-DIMENSIONAL IMAGING SYSTEM

BACKGROUND OF THE INVENTION

The invention described herein relates to radiant energy imaging systems, and in particular pulse echo imaging systems having a three-dimensional display capability.

Acoustic imaging techniques are well-known and extensively described in the prior art to provide visual inspection or analysis of all three phase states of materials, i.e., solids, liquids and gases. Examples of application of acoustic imaging techniques include industrial non-destructive evaluation of metals and liquids, medical ultrasound imaging, underwater imaging and echo ranging in the atmosphere. In the development of such techniques several classes of acoustic imaging systems have been devised. These various classes of systems obtain images in one-, two- or three-dimensions. The various types of imaging devices include direct imaging systems such as acoustic cameras or pulse-echo devices and indirect reconstructed imaging devices including acoustic holographic devices, synthetic aperture devices and computed tomographic systems.

Fundamentally, acoustic imaging devices perform two basic tasks: the acquisition of and the display of that data in a human readable form. Whatever of the various techniques used, a provision must be made for the latter two functions.

In order to provide a one-dimensional image the most prevalent technique is the pulse-echo A-mode technique in which a piezoelectric transducer transmits a short burst of acoustic energy into a medium, and then receives and displays the amplitudes of the echoes as a function of the echo range, i.e., the time of flight.

Of the known two-dimensional imaging techniques, the most significant is the pulse-echo B-mode tomography technique in which echoes returning to the transducer are displayed as brightness levels proportional to echo amplitude. The transducer generally used for such purposes is capable of being mechanically or electronically translated or steered in one dimension. In the display the brightness levels are displayed with reference to echo range and transducer position or orientation providing cross-sectional images of the object.

In order for there to be a better understanding of the known prior art imaging techniques reference should be had to FIG. 1 of the drawings. In this figure is shown a one-dimensional transducer array E,F which can produce a B-mode scan indicated as a portion of the object volume, E, F, W, V. B-mode images are comprised of many B-mode lines obtained at the rate of one B-mode line per transmitted acoustic pulse. The maximum B-mode line rate is given by:

$$R_{(lines/sec)} = V/2Z$$

where V is the acoustic propogation velocity and Z is the maximum range of the image. Recent developments in this field have included parallel signal processing techniques which enable one to obtain and display several B-mode image lines per acoustic pulse.

Orthographic projection imaging systems form a third significant class of acoustic imaging techniques. Devices of this nature include C-mode pulse-echo scanners, acoustic three-dimensional scanning systems, transmission or reflection acoustic cameras and acoustic holographic imaging systems. In these devices a three-dimensional volume of the object is interrogated by acoustic radiation using either "floodlight" insonification or beam formed pulses. Data from the volume can then be processed and displayed in several different ways. For C-mode imaging systems a single transducer or transducers operates in the pulse-echo mode. The transducers are mechanically or electronically scanned using a rectangular raster format so that a three-dimensional volume of the object is interrogated by the ultrasonic beam. Alternatively, the front surface of the transducer is fixed at a single point and the body of the transducer is moved in a spiral motion so that the transducer insonifies a conical three-dimensional volume in a spiral format.

In each case only echo data from a preselected range is displayed as brightness levels proportional to echo amplitude. Due to the use of a fixed focus lens and an electronic range gate, a C-scan device presents two-dimensional data in an orthographic display in which the display coordinates are the x,y cartesian coordinates of the targets at a fixed depth in the object.

To illustrate the above, in FIG. 1 a single element of the two-dimensional transducer array A,B,C,D is fired and receives echoes from one line of the three-dimensional volume. Only those echoes which are located in a predetermined range gate are displayed in a single image point. After each element of the array has been fired subsequently, the complete C-mode image will be obtained, for example, in the plane RSTU. Due to the fact that the display does not include target range, but includes directions perpendicular to target range, C-mode systems operate so that each point in the image requires a transmitted acoustic pulse. Thus, the time necessary to develop a complete C-mode image is significantly longer than the image formation time for B-mode image, and for example, an $N \times M$ C-scan requires $N \times M$ transmitted ultrasound pulses.

While the above described systems are not particularly useful for producing three-dimensional images, the prior art includes pulse-echo scanned three-dimensional imaging systems. One such system causes a transducer to be scanned in a raster format insonifying a three-dimensional rectangular parallelopiped. Cartesian coordinates are used in the display in a complicated manner which allows an orthographic display of a three-dimensional object in different projections but without image perspective. Again referring to FIG. 1, the three-dimensional volume using this system is interrogated as in the case of the C-scan, but in this case the echoes from the entire volume are displayed as a function of the X,Y coordinates so that parallel object planes in the Z direction overlap in the image.

Another prior art system utilizes a three-dimensional scanner in which a conical volume is insonified by a combination of sector steering plus rotation. Again, in this system cartesian coordinates are used in the display, although it is claimed that some perspective is obtained by modulating the size of the X,Y display with the third cartesian coordinate Z.

In each of the types of so-called three-dimensional scanning systems a line of pulse-echo data along one transducer orientation is displayed as a single point in the image. Accordingly, the time required to form the complete three-dimensional image is identical to the time required to develop a C-mode image. This amount of time is significantly greater than that required for the formation of a B-mode image. Therefore, while these systems produce a greater amount of information the time required for the production of that information is similarly greatly increased. Moreover, proper three-dimensional perspective is probably not achieved.

Transmission and reflection acoustic cameras these have been developed for medical and underwater imaging applications. The latter devices include a fixed focus acoustic lens and a receiving array of transducers in a water bath which limits their applications. The acoustic cameras are somewhat analogous to optical cameras. The receiving transducers function as a sampled film plane for an image formed by an acoustic lens. In these devices a range gate and the depth of focus of the lens restrict data to a fixed predetermined range resulting in an orthographic projection image similar to an acoustic C-scanner.

Additional prior art systems which offer prospects of producing three-dimensional images include acoustic holographic systems. These have the capability of obtaining data from a three-dimensional object by interference of an object wave and a reference pattern, i.e., a hologram. The three-dimensional image must then be optically reconstructed or reconstructed through the use of a computer from the hologram. This is a relatively complex and expense way of achieving this kind of data.

It is therefore an object of this invention to provide an improved radiant energy imaging system capable of producing an image of a three-dimensional object having an improved three-dimensional perspective relative to presently available techniques.

Another object of this invention is to provide an improved radiant energy pulse-echo imaging system capable of producing an image of a three-dimensional object with improved three-dimensional perspective.

A further object of this invention is to provide an improved radiant engery pulse-echo imaging system capable of producing an image of a three-dimensional object having improved three-dimensional perspective utilizing a two-dimensional dispaly having such perspective.

Still another object of this invention is to provide an improved acoustic imaging system capable of producing an image of a three-dimensional object in a two-dimensional display having perspective and having the capability in the two-dimensional transducer array of steering the transmit and receive orientations to predetermined orientations.

An additional object of this invention is to provide a system such as those described hereinabove having additionally the capability of range discrimination wherein such range discrimination can be accomplished using a range dependent gain control, brightness shading as a function of range or a color display having differing hues corresponding to differing ranges.

SUMMARY OF THE INVENTION

The foregoing and other objects are obtained in an improved radiant energy pulse-echo imaging system having the capability of providing an image of a three-dimensional object in a two-dimensional display wherein the angular relationship of targets at all ranges are preserved in the display thereby producing an improved display of a three-dimensional object.

The system of the invention uses a two-dimensional transducer array of, for example, piezoelectric elements or its equivalent which can be steered to assume predetermined transmit and receive orientations in both azimuth and elevation by producing (1) a directed transmit pulse and many simlarly directed receive orientations or (2) a non-directed transmit pulse and many directed receive orientations. For each transmit pulse a parallel processing system produces several unique image points whose locations in the image correspond to the tangent of the receive orientations in the azimuth and elevation planes. The brightness of each image point is the weighted integral of the echo data received along each receive orientation. In this embodiment the range information for the object is not displayed.

In accordance with the invention provision is made for the optional capability of range discrimination using a range dependent gain control, brightness shading as a function of range or a color display in which data originating from differing ranges is displayed in correspondingly differing hues. Echo data varying in signal amplitude from a given range are displayed in varying intensities of the corresponding hue. This option will also eliminate the effects in the image of overlapping structures in the object.

BRIEF DESCRIPTION OF THE DRAWINGS

The principles of the invention will be more readily understood by reference to the description given hereinbelow of a preferred embodiment which is constructed according to those principles and by reference to the drawings which are described briefly as follows.

FIG. 5 provides an illustration of an image of a parallelopiped using the scheme illustrated in FIG. 2;

FIG. 10 is a map of the scan memory portion of the FIG. 6 system;

FIG. 12 is a schematic diagram of the parallel processor portion of the FIG. 6 system;

FIG. 14 is a graph illustrating an example of a color coding scheme used with the FIG. 12 circuit.

DETAILED DESCRIPTION OF THE PREFERRED EMBODIMENT

In order to achieve a proper understanding of the construction and operation of the preferred embodiment of the invention to be described hereinbelow it is considered desirable to, at the outset, describe the results to be achieved. For this purpose reference should be had to FIG. 2 which provides a diagram of the scan geometry of an imaging system constructed according to the invention. It is to be understood that while the invention is described in the context of its use in an acoustic pulse-echo imaging system, it can be used with systems utilizing other form of radiated energy.

In this figure are shown two perpendicular linear transducer arrays 10 and 12, each having eight small transducer elements. These arrays transmit an acoustic pulse along a line T. The transmit beam width is broad and is uniform within the solid angle defined by origin 11 and angles 14 and 16. The transducer array then receives acoustic echoes from targets in the object volume. In this system parallel processing is used to obtain acoustic data simultaneously from 16 directions within the solid angle. A rectangular parallelopiped object 18 which will be discussed hereinbelow is shown as being outlined in the scan volume.

Figure 2:
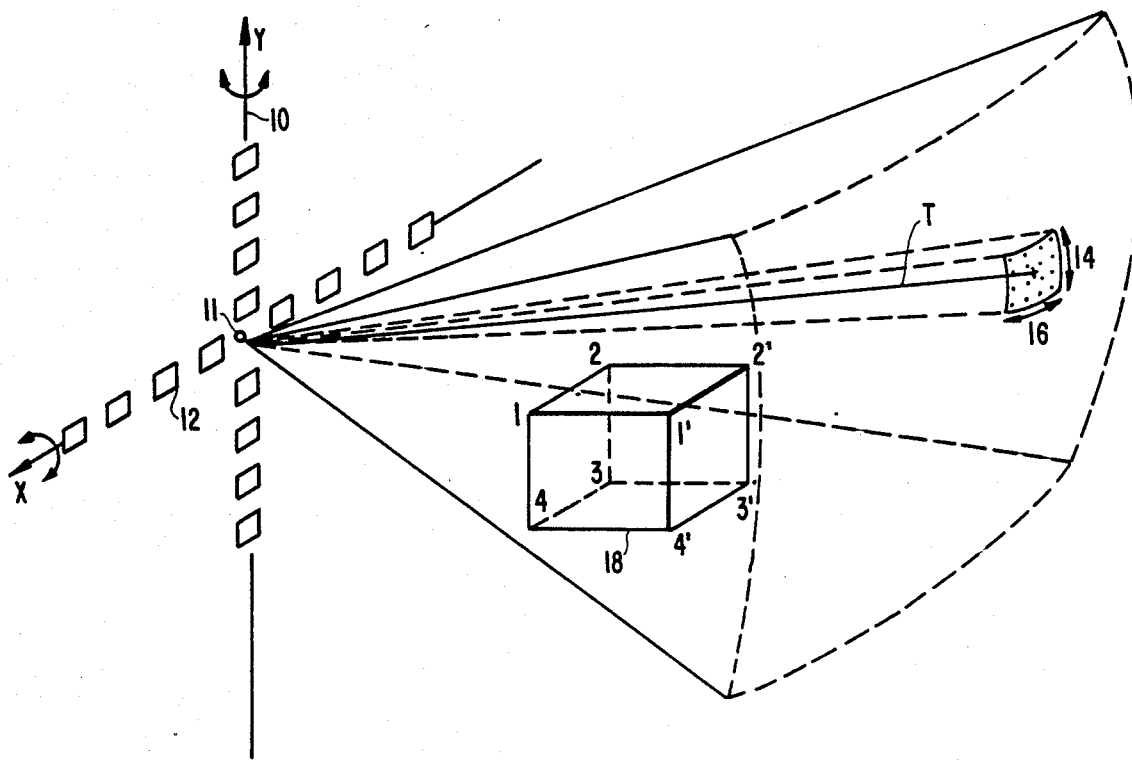
FIG. 2 is a diagram of a scan geometry of an imaging system having a transducer array and constructed according to the principles of the invention.
Figure 3:
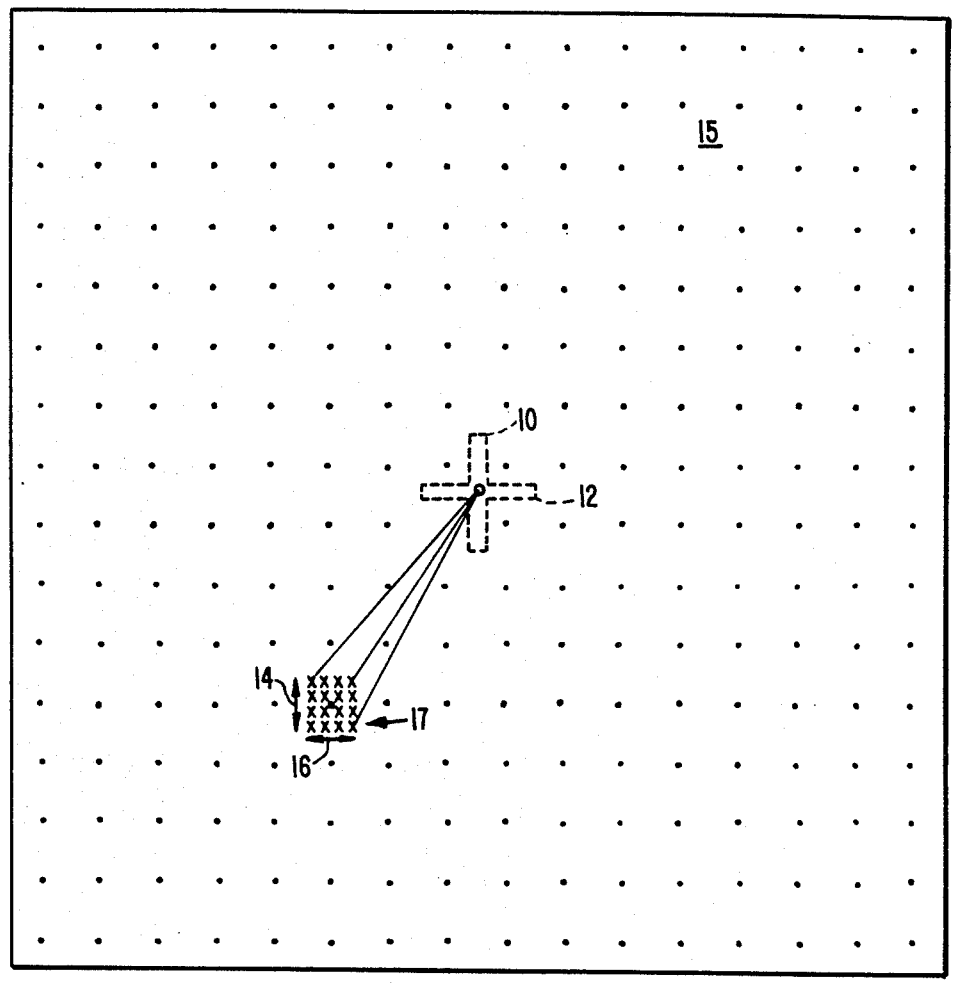
FIG. 3 is a diagram of the FIG. 2 imaging system scan geometry wherein the same geometry is viewed facing the transducer array.

FIG. 3 is a diagram of the imaging system scan geometry of FIG. 2, but shown from a view facing the transducer array 10, 12. Using this system of the invention a complete image having perspective is formed through the transmission of 256 acoustic pulses, which are transmitted at orientations relative to the origin as shown by the large matrix of 16×16 dots indicated by the numeral 15. The orientations of the 16 parallel receive lines for the acoustic burst transmitted along line T within the pyramid or solid angle 11, 14, 16 in FIG. 2 are indicated by the 4×4 array of x's indicated by the numeral 17. Parallel echo data acquisition is implemented for each transmit pulse so that an image includes echo information, in this case, 4,096 orientations in the scan volume of 64 elevation directions by 64 azimuth directions. Thus a 64×64 pixel image results from the transmission of only 256 acoustic pulse.

The foregoing will illustrate that the system functions entirely unlike A-mode or B-mode systems in that acoustic information is integrated over the entire target range during the receive operation. Thus at the end of reception one value represents the acoustic information from one direction. The overall operation of the system results in the display of an image in which a multiplicity of echoes from targets along each steering direction in both elevation and azimuth are displayed as a single point.

Figure 4:
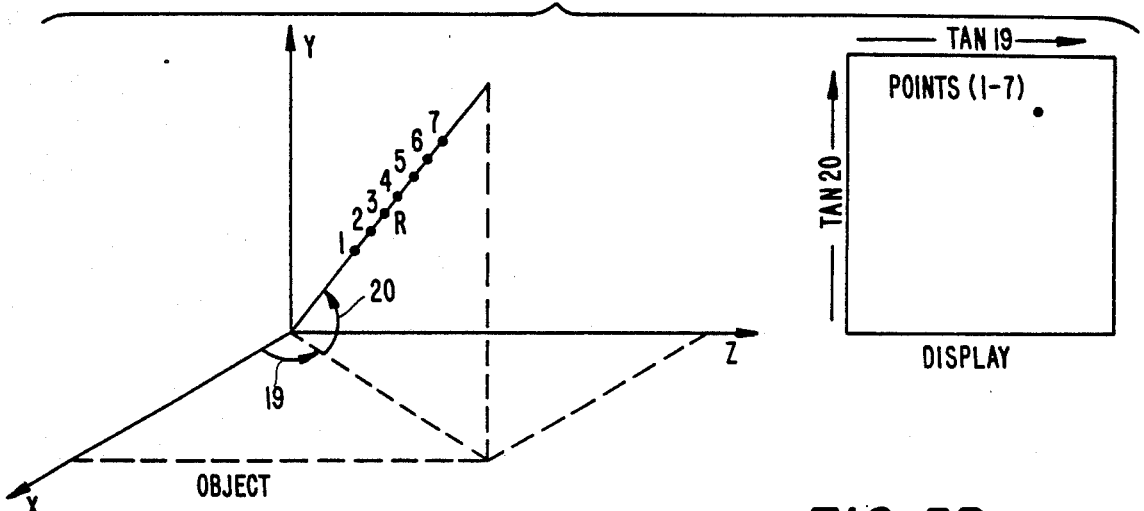
FIG. 4 is a diagram providing an object to image map of the scan geometry illustrated above.

Referring to FIG. 4 which is an object to image map it will be seen that acoustic echoes from targets 1 through 7 along the receive line R determined by the angles 19 and 20 in the object volume are displayed as a single point in the image indicated as $P_{(1-7)}$. The position of the latter image point in the display is determined by the tangents of angles 19 and 20.

Figure 1:
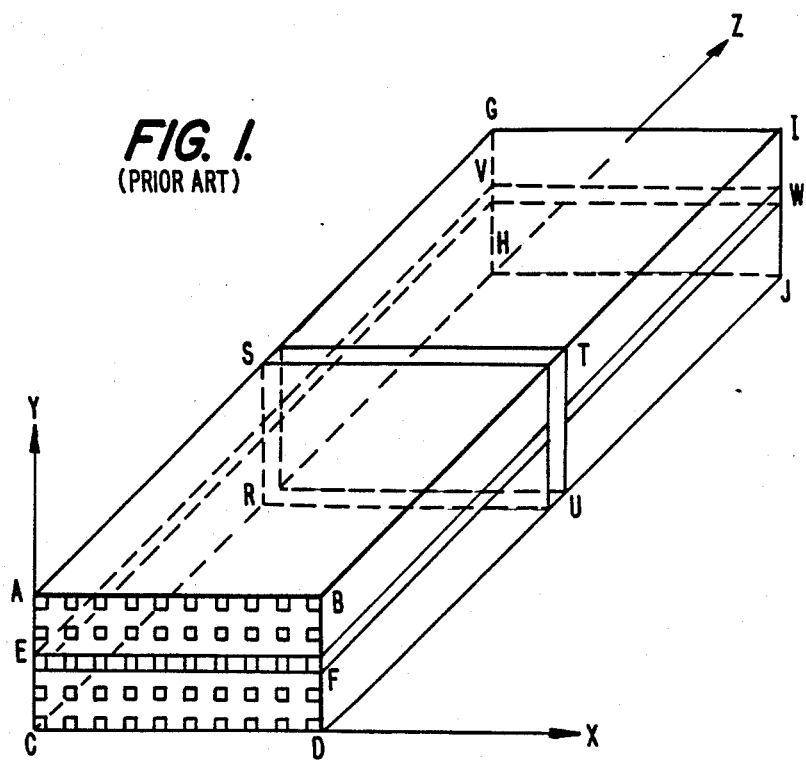
FIG. 1 is a diagram used in conjunction with the description of the prior art given hereinabove.

As the steered acoustic beam interrogates the entire object volume shown in FIG. 1, each receive mode orientation is mapped onto a unique point of the two-dimensional displayed image. The angular relationship of targets in the object volume as viewed from the origin is uniquely preserved by this display technique. Therefore, a true perspective image is obtained in an image which is analagous to that of an optical camera.

Figure 5A:
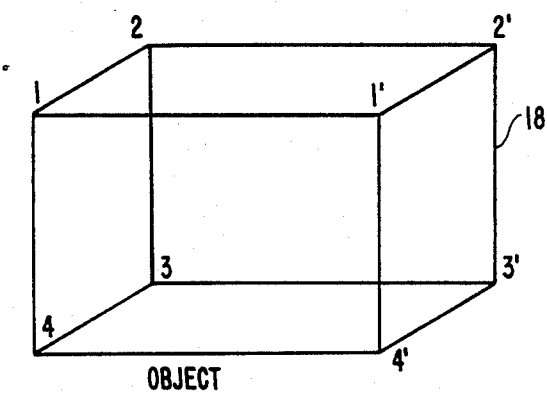
FIG. 5a illustrates the parallelopiped as an object and FIG. 5b illustrates the displayed image of a rectangular parallelopiped.

FIG. 5a provides an example of the foregoing imaging technique, and in this figure is illustrated the use of the parallelopiped referred to in connection with FIG. 2 as an object.

Figure 5B:
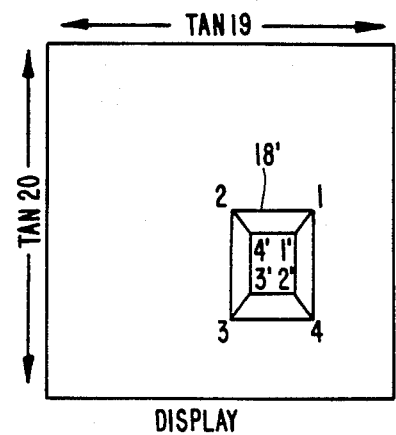

FIG. 5b illustrates the displayed image of the rectangular parallelopiped. Note that the face 1'-4' is smaller in perspective than the actual face 1-4 in proportion to the relative distances of the two faces from the transducer.

Figure 6:
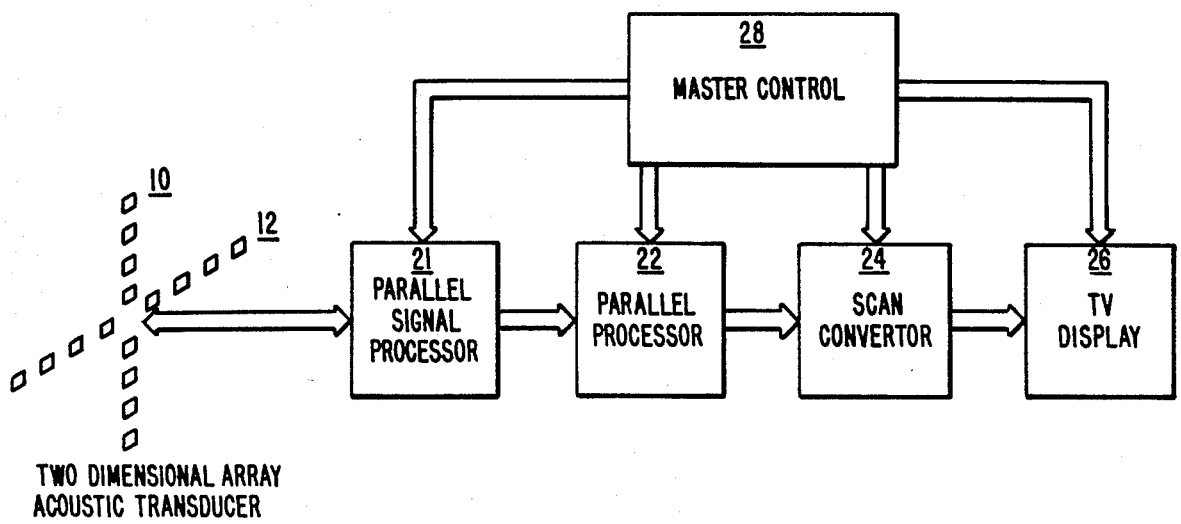
FIG. 6 is a block-schematic diagram of a preferred embodiment of an acoustic imaging system constructed according to the invention.

FIG. 6 is a block schematic diagram of a preferred embodiment of an acoustic imaging system constructed according to the principles of the invention. The system includes the acoustic transducer array exemplified by the two one-dimensional piezoelectric tranducer arrays 10 and 12, arranged perpendicularly to one another, a signal processor 21, a parallel processor 22, scan converter 24, video display monitor 26 and master control unit 28. The construction and operation of each of these elements will be described in greater detail hereinbelow.

Figure 7:
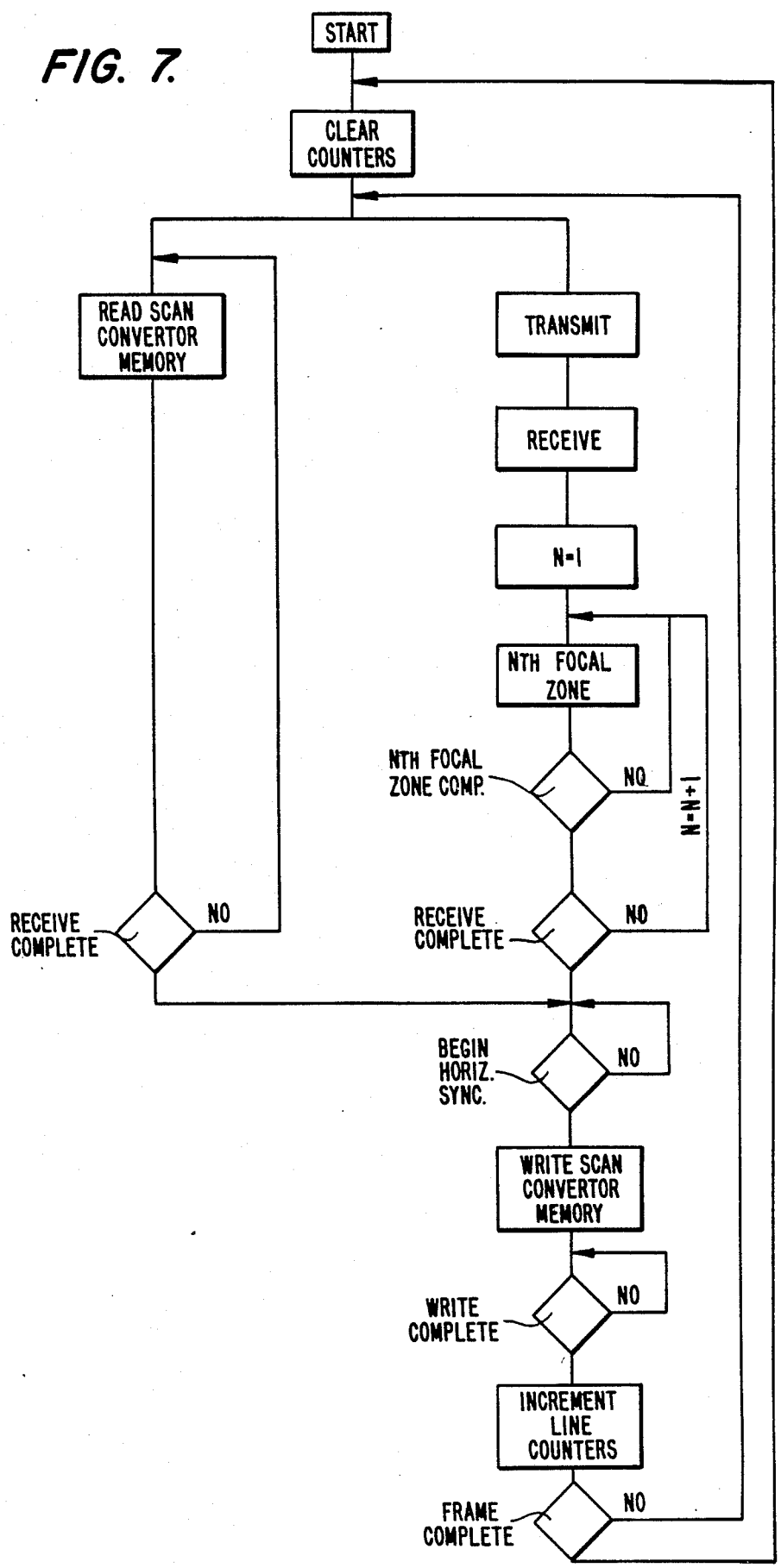
FIG. 7 is a flow chart describing the sequence of operation of the FIG. 6 system.

The operation of the FIG. 6 system can best be understood by reference to a flow chart given in FIG. 7 of the drawings. For purposes of clarity it is helpful to consider parallel processor 22, scan converter 24 and video display 26 separately from the transducer array 10, 12 and the signal processor 21. As indicated in FIG. 6 master control 28 regulates the function of all these subsystems.

During normal operation scan converter 24 is usually in the Read mode so that acoustic information stored in its memory is being displayed. Whenever all acoustic information from one transmit burst has been received and the video display 26 begins a horizontal retrace interval, a scan conversion memory is updated with new acoustic information. In this way the displayed image frame rate is always 30 frames/second regardless of the acoustic acquisition times. At the completion of data transfer to the memory of scan converter 24 new scan data are selected from the next transmit/receive lines, and a new acoustic burst is transmitted. Simultaneously, the video system is placed in the Read mode so that at the end of a horizontal synchronization period the memory of scan converter 24 can again be read and the most current acoustic image displayed.

Referring more directly to the flow chart, with the reception of a START command the data addresses of the scan memory, the memory addresses of scan converter 24 and the necessary counters in master control 28 are initialized. Transmit pulses fire the elements of transducer arrays 10, 12. These elements then receive the acoustic echoes from targets in the object volume until echoes from a predetermined maximum range have arrived at which time a Receive Complete signal terminates the Receive mode. During the process of the receive operation the focus of the two-dimensional array tracks the range of origin of the returning echo data. In the described embodiment the Receive mode is, for example, comprised of 15 discreet focal zones. In parallel operation during the Transmit and Receive periods a portion of the memory of scan converter 24 which stores the image data in digital form is read sending previously obtained image data to the video display 26. After Receive Complete, and upon initiation of the next horizontal sync pulse for the video display, all new echo data are written in to the proper locations of the scan converter memory. A Write Complete signal is received, the scan memory locations are imcremented and the entire cycle is repeated.

Figure 8A:
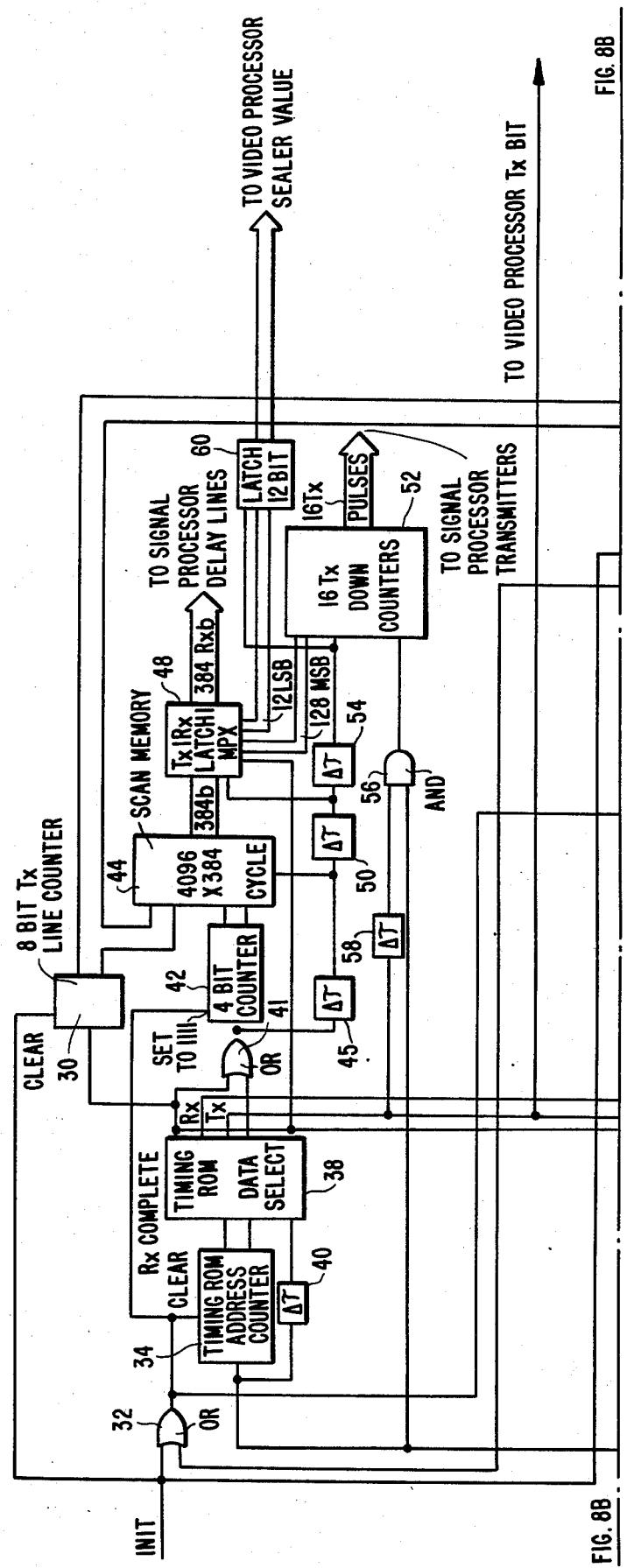
FIG. 8a comprises the upper half of the schematic and FIG. 8b comprises the lower half.
Figure 8B:
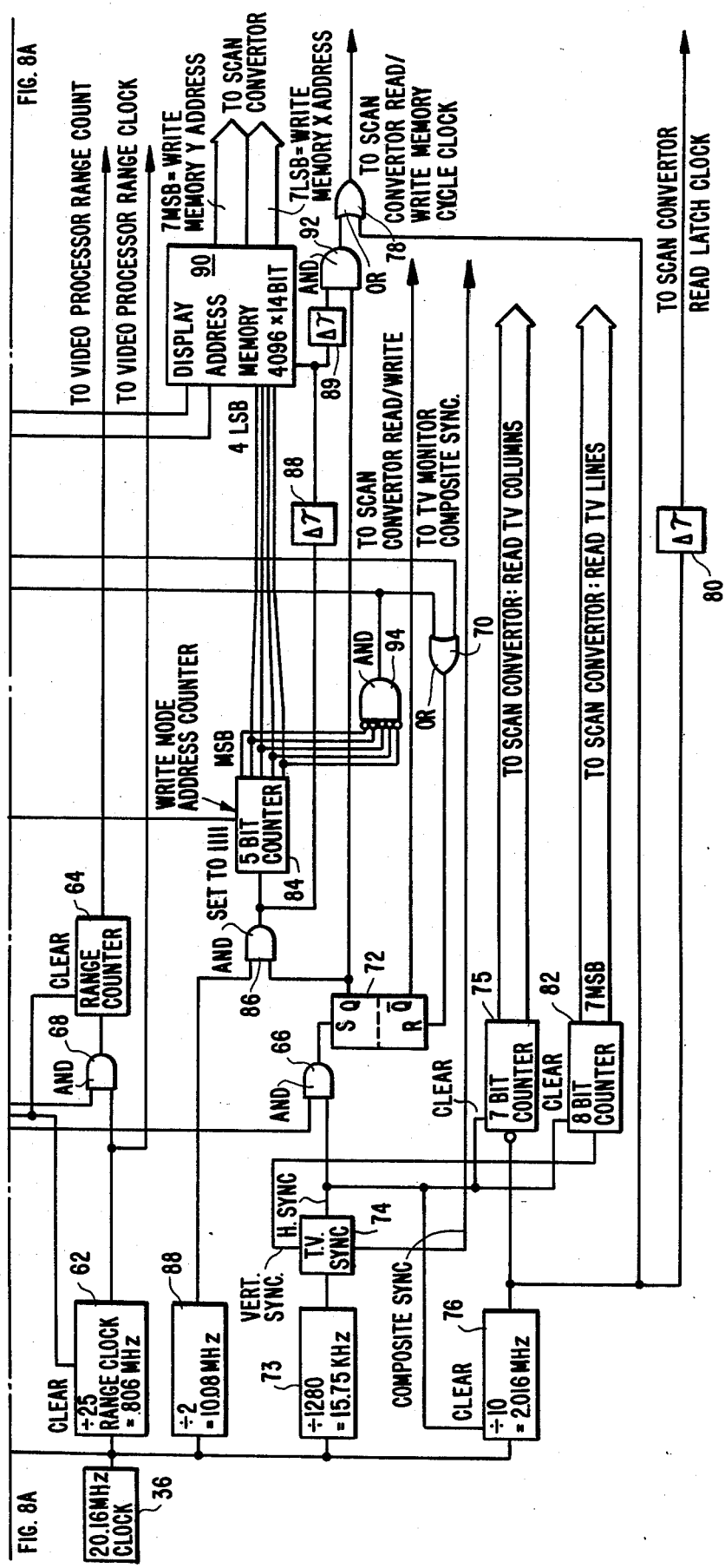
FIG. 8 is a schematic diagram of a preferred embodiment of the master control portion of the FIG. 6 system.

FIG. 8 is a schematic diagram of a preferred embodiment of master control 28.

An external input signal INIT initiates operation of the entire imaging system by triggering several functions of master control 28. INIT clears an 8 bit counter 30, which is also identified as the transmit line counter. The 8 output bits from counter 30 are sent by means of bus 31 to scan memory 44. These 8 bits comprise the 8 most significant bits of the addresses for the scan memory. The INIT signal also enables OR GATE 32, the output of which clears a timing ROM address counter 34 and sets the 4 bit counter 42 to ones.

The described embodiment is timed by a 20.16 mhz master clock 36 resulting in a pulse rate of one pulse approximately every 50 nano-seconds. The clock pulses are sent to counter 34 which then increments the address of the timing ROM (read only memory) 38 every 50 nano-seconds. A delay circuit 40 also receives the timing signal from clock 36, delays it by a predetermined period of time and applies it to the timing ROM to recycle after a preselected delay. Timing ROM 38 is in this embodiment 4 bits wide and several thousands of bits long depending on the maximum range of echo information to be found in the image. The data contained in timing ROM has been calculated "off line" according to conventional techniques of phased array imaging devices, and it is loaded into the timing ROM prior to operation of the imaging system.

Figure 9:
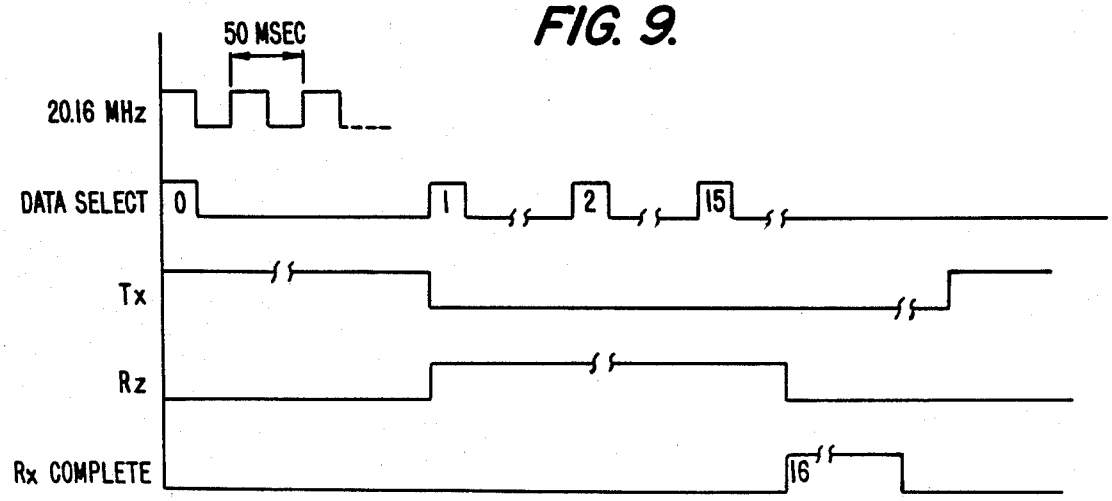
FIG. 9 is a timing diagram indicating the relative timing of certain operating signals and the pulses of a master clock for the FIG. 8 circuit.

This data provides accurate timing pulses to signal the onset and completion of the operations which occur during the transmission of a single acoustic burst and the subsequent simultaneous acquisition of echo data for 16 orientations. The four bits of the timing ROM include a data select bit, a transmit bit, a receive bit and a receive complete bit. Referring to FIG. 9 the relative timing of these signals and the pulses issued from the master clock 36 are shown. The least significant bit from the timing ROM 38 is the above-mentioned data select bit which enables OR GATE 41, the output of which is sent to a four bit counter 42. When counter 42 is incremented, its output is sent by means of bus 43 to the scan memory where it forms the four least significant bits of the address of the scan memory. Thus, each address in the scan memory is uniquely determined by the twelve bit word resulting from the combination of the output from counter 30 and counter 42.

For purposes of better understanding it is now appropriate to refer to FIG. 10 which provides a map of scan memory 44, which memory contains the steering and focusing data for the 256 potential transmit orientations and the 4,096 potential receive orientations. As previously stated, the scan memory data is calculated according to conventional techniques for focusing and steering phased array imaging devices and is then loaded into memory prior to operation of the described system.

Scan memory 44 is divided into 256 blocks corresponding to the 256 transmit lines. Each block contains 16 words, each of 384 bits. In the first word of each block the 128 most significant bits contain the transmit data for the 16 transducer elements of 2-dimensional transducer array 10, 12 in FIG. 1. There are eight bits of control data for each of the 16 transducer elements. The 12 least significant bits of the first word contain a scaler data value which is an inverse functin of the maximum range of the echo data. This value is past to parallel processor 22. The other remaining bit segments of the transmit word are not used.

The succeeding 15 words, each 384 bits long, of each block contain the Receive mode data of the 15 focal zones. This data is sent to signal processor 21.

Scan memory 44 is cycled by the data select bit through OR GATE 41 after a suitable delay 45, and the scan memory data corresponding to the new scan memory address is passed to latch 48. After an additional short delay 50, the latch 48 is cycled, and the data passes to its next destination depending on the direction of operation of latch 48. The latter direction is determined by the transmit bit from timing ROM 38 which is set to initiate the transmit acoustic burst. If the bit is set, the direction of data flow from latch 48 is such that the 128 most significant bits are sent to the 16 transmit down counters 52, eight bits of data per down counter immediately after the passage of the data select bit through delay 50. After a further delay 54 the data is loaded into the down counter.

At the same time the transmit bit from the timing ROM 38 additionally forms one input to an AND GATE 56, which input is suitably delayed by a delay 58 to occur after delay 54. The master clock pulses form the second input to AND GATE 56, and the output therefrom serves as the clock for the down counters 52 so that they now begin to count down at 20.16 mhz. As each counter reaches zero it sends the properly timed transmit trigger pulse to its respective transmitter circuit which will be shown in connection with the description of signal processor 21.

At the same time as the occurrance of the latter operation, the twelve least significant bits of the transmit data move to a twelve bit latch 60. After delay 54, latch 60 is cycled, and the data is sent to the parallel processor 22.

As shown in FIG. 9, upon completion of the transmit process the Tx bit goes low. The data select bit is again set so that the address in scan memory 44 is incremented to one, and the receive bit Rx is set. The scan memory data for the first receive mode focal zone passes through latch 48 which has been switched to permit data flow to the signal processor 21. As may be determined from FIG. 9, this process continues for 15 focal zones. The Rx bit is set during the entire time. When all the echo data from distances out to the predetermined maximum range has been received by the imaging system, the Receive Complete bit is set by timing ROM 38 and the Rx bit goes low. The Receive Complete bit increments transmit line counter 30 as well as four bit counter 42. The output of four bit counter 42 is now at zeros. The address in scan memory 44 is now 16, the first word of the second transmit block. Shortly thereafter, the Tx bit is set for the second time, and the acoustic burst is transmitted for the second process of echo data.

During reception of echo information, the range of origin of the data is determined by a range clock 62 and range counter 64; both of these components are cleared by the Tx bit before the Receive mode begins. The range clock 62 runs at a frequency of 0.806 MHZ which is obtained by passing the output of the master clock through a divider therein. The output of the range clock forms one input of AND GATE 68 along with the Rx bit so that during the receive mode range counter 64 is incremented upon the passage of each 1.240 micro second. When the Rx goes to a low value at Receive Complete, the range counter 64 stops. The rate of arrival of acoustic echoes in a pulse-echo imaging system operating in a water-like medium is 1mm of data every 1.33 micro second. Thus, the range clock divider can serve as a measure of echo range with a known accuracy of less than +7%. Judicious selection of a clock frequency can reduce this inaccuracy. Moreover, range clock 62 may also be changed to a differing divisor if different accuracies of range discrimination are desired.

The operations of the master control during the Read scan converter process will now be described.

The INIT signal enables an OR GATE 70, the output of which resets a flip-flop 72, the $\overline{Q}$ output of which is passed to the scan converter as the Read/Write control bit thereby placing the scan converter in the Read mode so that the stored image data can be sent to the video display.

Divider 73 reduces the 20.16 mhz clock to a 15.75 khz frequency, the usual frequency used for television synchronization. This is used to time a television type synchronizing generator 74 which produces horizontal sync pulses, vertical sync pulses and a composite of the two, referred to herein as a composite sync pulse. The latter is communicated to the display monitor.

The horizontal sync pulse clears a seven bit counter 75 driven at a rate of 2.016 mhz using the inverted output of divider 76. This seven bit counter increments the scan converter Read memory addresses corresponding to the individual pixels or t.v. columns along a raster line. Thus, in this example there are 128 pixels per horizontal t.v. line. The divider 76 also cycles the scan converter memory during a Read process by means of an OR GATE 78 after the read memory has been incremented. Divider 76 cycles the scan converter Read latch (described hereinbelow) after a suitable selected delay 80.

The vertical sync pulses operate a rate of 60 hz producing 60 display fields per second and it clears an eight bit counter 82 driven by the horizontal sync pulses. The seven most significant bits of counter 82 increment the scan converter Read/Memory addresses corresponding to the 128 t.v. lines in a field as used in this example.

Referring back to the flow chart, the Receive Complete signal ends the Read scan converter memory process during which some portion of the image data has been sent to the display monitor. The breadth of that portion depends on the maximum image range. After the receive complete trigger the system awaits the beginning of the next horizontal synchronization pulse at which time the Write scan converter memory process begins to write the newly acquired echo data into the scan converter. This process is controlled by the master control in the following manner.

The INIT signal supplied through OR GATE 32 initializes a five bit Write mode address counter 84 by setting it to all ones. The Receive Complete trigger is an input to AND GATE 66 along with the horizontal sync pulse. The output of AND GATE 66 sets flip-flop 72 which switches the scan converter Read/Write control bit to Write ending the Read memory operation. The Q output of flip-flop 72 is an input to AND GATE 86 along with the output of a divider 88 pulsing at a rate of 10.08 mhz. The output of AND GATE 86 increments counter 84, the four least significant bits of which are the four least significant bits of the X addresses of display address memory. The latter are incremented at the same rate of 10.08 mhz.

The output of counter 30 forms the eight most significant bits of the addresses of display memory 90. The data from the display address memory accomplish the object volume mapping into an image plane. In the described embodiment the memory is 4,096 words long by 14 bits. The data is loaded into the memory prior to operation of the imaging system. The seven most significant bits of each word comprise the Write memory Y address of the scan converter while the seven least significant bits of each word comprise the Write memory X address of the scan converter. The output of AND GATE 86 passed through delay 88 cycles the display address memory 90 and the Write memory addresses thereof pass to the scan converter.

The Q output of flip-flop 72 and the output of AND GATE 86 as delayed at 88 and 89, are the inputs of AND GATE 92, the output from which enables OR GATE 78. The output of this GATE is the Read/Write memory cycle clock of the scan converter. Thus during the Write process the scan converter memory is cycled at a rate of 10.08 mhz and the 16 data points are written into the scan converter in less than 2 micro seconds. Finally, the most significant bits of the five bit Write mode address counter 84 enables a five input AND GATE 94, the output from which enable OR GATE 70, which in turn resets flip-flop switching back to the Read mode. The output from AND GATE 94 is additionally used to reinitialize master control 28 beginning the process for the next cycle of transmission and reception.

In accordance with the particular mode previously described a 64×64 or 4,096 pixel image frame is obtained using a total of 256 acoustic pulses due to the 16 to 1 parallel processing to be described. After the 256th transmit pulse, the image is complete, and master control begins to operate to produce the next succeeding image.

Figure 11B:
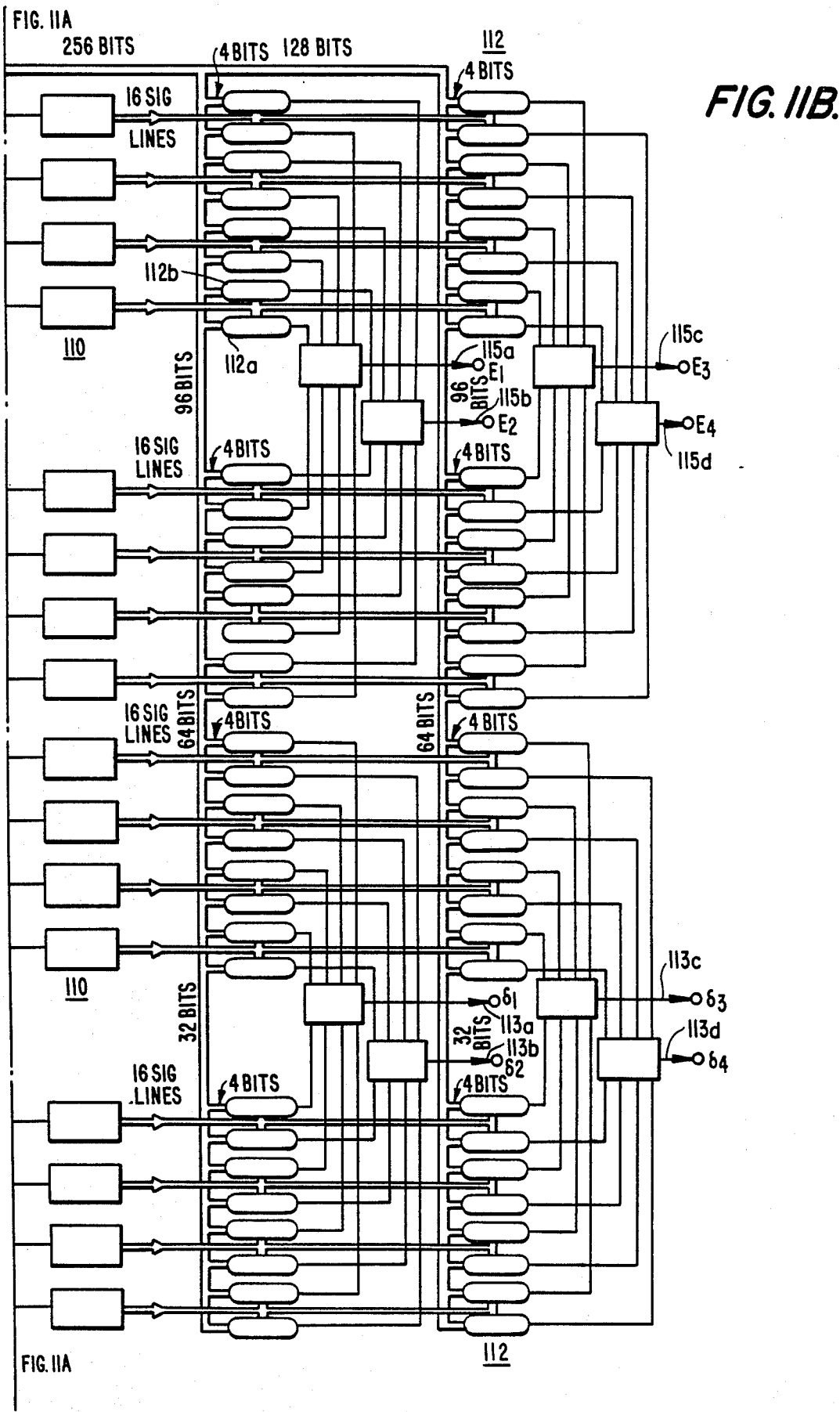
FIG. 11 is a schematic diagram of the signal processor portion of the FIG. 6 system.
FIG. 11A comprises the left side of the schematic and FIG. 11B comprises the right side.

FIG. 11 is a detailed schematic diagram of the parallel signal processor 21 of the FIG. 6 system.

The two orthogonal transducer arrays 10, 12 each are shown as consisting of eight elements. Each element of both arrays are connected to a series of transmit pulsers 100 and receive amplifiers 102. In the described embodiment 16 transmit pulsers 100 are utilized to excite the array elements thus producing the transmitted acoustic beam. The direction of transmission in the azimuth direction and the elevation direction is controlled by 16 time sequences of the 16 Tx pulses from master control 28 which trigger the pulsers 100. Each pulser has a unique Tx input so that eight such pulsers are required to trigger the pulsers of the ten array and similarly eight pulses are required to trigger the pulsers of the twelve array. As previously mentioned, in this embodiment 16 unique azimuth and 16 unique elevation orientations are used. By this means, 256 unique transmit directions can be realized.

Echoes resulting from each of the 256 acoustic transmissions are received by all elements of the array and are coupled to receive channels 104 and 106. Receive amplifiers 102 are identical in each of the latter channels, and in this embodiment these are made to have gain control capabilities to permit compensation for loss of signal as a function of range. This feature may also be employed to image only those targets appearing at a specific range. The latter amplifiers alternatively may include non-linear amplification capabilities such as logarithmic compression.

The outputs of receive amplifiers 102 are connected to imputs of delay systems 108, the outputs from which serve as inputs to secondary delay systems 110. Delay system 110 is constructed so that the input signal is delayed progressively by 1 to 16 delay increments. Thus, the output signals from delay elements 108 are delayed by up to 16 delay increments. As will be understood, the two delay systems 108 and 110 are used to provide correct receiver delays to permit steering and focusing of the ten and twelve arrays during a receive operation.

The 16 outputs from each one of delay systems 110 form an input to four separate multiplexers of a plurality of multiplexers 112 associated with that channel. For example, in connection with receive channel 111 multiplexers 112a, 112b, 112c and 112d are used. The outputs from all of the multiplexers 112 are summed to produce four receive lines 113a–d from array 12 and four receive lines 115a–d from the array 10 for each transmitted pulse.

The delay control for each of the 16 receive mode channels is accomplished by the 384 Rx bits obtained from master control 28 in the manner described hereinabove. The delay of each input signal to the main receive delay system 108 is individually controlled by eight bits. For this reason 128 bits are required to specify the delays on all 16 delay systems 108. An additional 16 bits per main receive channel are required to select the correct incremented signal delays from secondary delay systems 110. That is, each of the four signal multiplexers in each channel has a four bit control to permit selection of one of the 16 outputs from a delay 112. For this reason 4×4×16 or 256 bits are required to specify the outputs of all 64 signal multiplexors.

It should be understood that each of these delay means may be either analog or digital or a combination of both may be used.

The parallel signal processing operation is carried out further in connection with parallel processor 22 which is described in greater detail in connection with the FIG. 12.

As will become clear this element of the FIG. 6 system performs several functions. It completes the parallel signal processing operation begun in connection with processor 21, it performs normal functions for video processing circuits and it implements the optional range discrimination capability based on color encoding or amplitude weighting with range. In its video processing aspect parallel processor 22 rectifies parallel echo data on a full wave basis and then provides for a low pass filter. The result is the equivalent of envelope-detection before the echo data passes to the display or to the scan converter via analog to digital conversion.

The eight analog lines 113 and 115 carrying the echo data enter parallel processor 22 on similarly identified lines. The lines 115 represent four parallel elevation orientations, and the lines 113 represent four parallel azimuth orientations. These orientations lying in the two perpendicular planes are expanded to 16 orientations covering the solid angle described in connection with FIG. 2 by 16 two input summations of the 16 possible combinations of elevation and azimuth orientations.

After transmission of an acoustic burst from array 10, 12 the second word of each scan memory block from master control 28 corresponds to the necessary receiver delay controls which will permit steering and focusing of all 16 receiver lines at the closest range. At preselected times stored in timing ROM 38 of master control 28 new Rx bits are transmitted to signal processor 21 to allow for focusing of all 16 receiver lines at a further range. This process continues until information for all 15 focal zones has been obtained. In this way dynamic focusing of the receiver array can be achieved. For applications in the Fraunhoffer region dynamic focusing is not required so that only one Rx word would suffice for the entire image formation process.

It is contemplated that the invention described herein can be utilized with any two-dimensional transducer array or in the alternative a one-dimensional array steered by a motor or a mirror in which groups of transducer elements are combined in the Receive mode to produce a predetermined number of image points. Moreover, the degree of parallel processing can be increased or decreased. An extreme extension of the principles of the invention will result in all image points being constructed in parallel to produce a projection image, the entirety of which is obtained with a single transmitted acoustic pulse.

The received echo data are applied to full wave rectifiers 116a and 116b and then to low pass filters 118a and 118b, the component values for which are selected to obtain frequency ranges suitable for Z axis video data. The signals are then applied to analog to digital converters 120a and b in parallel. These converters are driven at a rate determined by the master control range clock 62 described above, and it will be remembered that a divided 0.806 mhz signal is used.

In this example the analog to digital conversion resolution is chosen as six bits, but other values may be used. The outputs from converter 120a are split into three parallel identical channels 121a–c for color encoding. The output channels from converter 120b are 123a–c. For each group of three channels, each channel corresponds with a primary display color, such as red, blue and green, so that there are now in effect 48 parallel channels of 6 bits. Each of these channels forms one input to the 48 digital multipliers 122. The other input to the multipliers is the color encoding data. Three parallel Read only memories 124a–c contain the color data.

A very simple scheme of color encoding will be seen by reference to FIG. 14. The maximum image range $R_{max}$ is divided into three equal segments one for each primary color. In the first segment the red data has an amplitude of 1, and the blue and green data are 0. The second segment shows blue to be 1, while the other colors are at 0. Finally, the third segment shows green to be 1 and red and blue are 0. In each ROM 124 the number of color data words is determined by the maximum range address of the timing ROM 38 measured in terms of range clock pulses from master control 28. The memories are cycled in parallel with each count of range clock 62. As the three memories 124 are read, the outputs are fed to three parallel digital latches 126a–c, one of which is coupled to each ROM 124. These latches are also cycled by the range clock. The outputs from the three latches from the second input to the 48 digital multipliers. Thus for each of the 16 parallel channels the data is multiplied in three parallel operations by the red, blue and green color encoding data.

Next, the color weighted echo data in the 48 parallel channels pass through 48 parallel digital adders 128 to integrate the echo data over the preset maximum range. Thus, the output of each adder is a single digital value corresponding to the integral of the echo data over the image range as weighted by the color coding. For example the coding of the red output of channel 1 is the integral of channel 1 over the first third of the maximum range.

The output of each adder 128 is one input to one of plurality of digital scalers 130. The scalers perform the function of preventing overflow. The value of the scaler reference received from the scan memory of master control 28 is inversely proportional to the maximum range. The outputs from the 48 digital scalers are divided into three groups of 16 corresponding to the three colors discussed above. These are the input pixel data to scan converter 24. It will be remembered that the digital adders 128 are each cleared for each acoustic pulse by the Tx transmit bit from the master control. A delay 132 is inserted between the range clock count and the cycle of memories 124 and converters 120 to allow for each echo data flow through the signal processor 21 up to the converters 120. An additional delay 134 is inserted between the memories 124 and latches 126 so that the range address of the color coding is identical to the range of origin of the echo data at the digital multipliers. A third delay 136 is inserted before cycling adders 128 to allow data to flow through the multipliers.

It is contemplated that while a relatively simple color coding scheme is described, many other complex forms of color coding with range could be implemented using read only memories. Additionally, the range weighting option can be implemented in combination with the color coding by an additional identical weighting of the color data in the three read only memories 124 with range.

It will be remembered that another range discrimination option discussed hereinabovoe is through the use of amplitude weighting of echo data with range to produce a C-mode image, for example. If this technique is utilized, all digital processing downstream of low pass filters 118 will be eliminated and replaced by 16 parallel analog multipliers, each having one input from each of the 16 echo data lines and the second input from the range weighting. The range weighted outputs of the multipliers could then be multiplexed directly to the Z axis drive of an electrostatic display monitor. Additional alternatives can include digital multiplication and/or digital scan conversion, as well as optical scan conversion.

Figure 13:
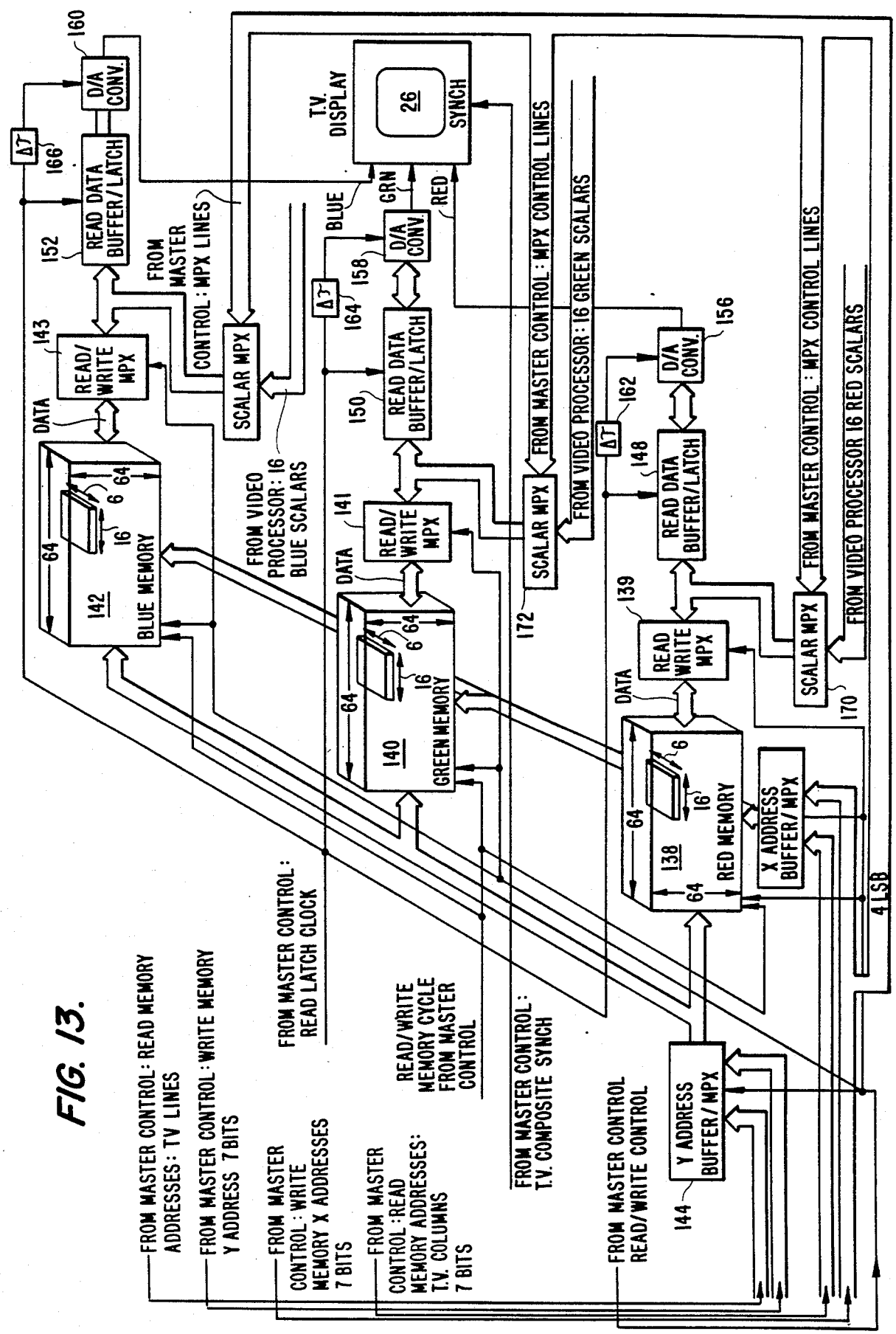
FIG. 13 is a schematic diagram of the scan converter portion of the FIG. 6 system.

FIG. 13 provides a detailed schematic illustration of scan converter 24 of the FIG. 6 system.

This scan converter has as its major function the enablement of a color display of three-dimensional image data in a conventional television format. In this example this is contemplated to be 60 complete fields or screens per second including a display dimension of 64×64 image pixels per field. This is accomplished using 256 transmitted acoustic pulses as described above.

A major portion of scan converter 24 comprises three parallel digital memories 138, 140 and 142 corresponding to the three primary display colors. The memories store the image data which are written into each memory, 16 pixels at a time, until the data is read out to video display 26.

It will be remembered that master control 28 produces video sync pulses at a rate of 60 hz clearing the two counters which determine the X and Y addresses in scan converter 24. Following the next Write memory operation the master control sets the Read/Write control bit to read. This bit is applied to several destinations in the scan converter. The read bit switches a Y address buffer/multiplex 144 and an X address buffer/multiplex 146 so that these buffers will accept read memory addresses from the master control and pass the read addresses to the scan converter memory. The Read bit also is coupled in parallel to color memories 138, 140 and 142 to switch them to the Read mode. The Read mode is additionally sent in parallel to the Read/Write multiplexers 139, 141 and 143 of each of the latter memories to allow the digital image data to pass from the memories to associated read data buffer latches 148, 150 and 152.

Upon receipt of a read control bit buffer 144 passes a seven bit data address in parallel to memories 138–142. This is the first line location of the pixel data. At the same time, the X address buffer 146 passes a seven bit data address in parallel to the same three memories forming the column location of the first pixel. Subsequently, the first 2.016 MHZ clock pulse from master control 28 cycles the memories 138–142, and the first addressed data value moves in parallel from the memories through multiplexers 139–143 through, respectively, latches 148, 150 and 152. When the latches are cycled in parallel as described hereinabove the data value moves from the latches to the three parallel digital to analog converters 156, 158 and 160, respectively. After a delay, the same latch clock pulse cycles the converters, and the data value moves in parallel to the inputs of video display monitor 26. At this point the first pixel of the image is displayed. The video display 26 receives composite horizontal and vertical synchronization from the master control 28 as described hereinabove.

The trailing edge of the first clock pulse will have also incremented the Read memory X address buffer 146 so that with the second 2.016 mhz pulse the Read cycle is repeated for the second pixel. After 64 such pulses, the 64 pixels of the first t.v. line will have been displayed. As previously discussed, the next horizontal sync pulse will occur. The X address counter in the master control is cleared again to read a new row of data and the row address counter is incremented. However, only the seven most significant bits of this counter serve as the t.v. line addresses so each line is repeated two times in the display for the limited number of pixels used in connection with this example before the Read memory address is incremented.

Using the parameters discussed herein 1/60 second is required to read and display the entire memory so that some large fraction of the entire read process is completed during the transmit/receive period of a single acoustic pulse depending on a maximum range in the image. The read mode of the scan converter is ended at the initiation of the first horizontal sync pulse after the Receive Complete bit has been set in the master control for each and every transmitted acoustic pulse. The Read/Write control flip-flop 72 is then set to Write in the master control.

This produces the following Write operation. Address buffers 144 and 146 are switched to accomodate Write memory address. The memories 138–142 are switched into a Write mode. The Read/Write multiplex units 139–143 can now pass digitized video data from the parallel processor 22 to the memory. After the Read/Write control bit is set to Write, a Write memory Y address may be passed through buffer 146 in parallel to the three memories 138–142. At the same instant, the Write memory X addresses pass through buffer 146 to the same three memories. The four least significant bits of these addresses are sent in parallel to the three parallel 16 to 1 scaler multiplexers 170, 172 and 174. One of these is supplied for each color memory. At the input of each of the three scaler multiplexers is applied the 16 digital values corresponding to the integrated color echo data in the 16 parallel echo channels, i.e. the 48 outputs from processor 22. The four least significant bits of the Write memory X addresses form control bits which select which of the 16 echo data points will be permitted to pass through the scaler multiplexers 170–174, as well as through the Read/Write multiplexers 139–141 to be written into the memories.

After a delay, the three memories of the scan converter are cycled in parallel so that the first scaler data value in the three colors from parallel processor 22 is written in to the first memory location of each memory. Each subsequent 10.08 mhz clock pulse increments the Write memory X address in buffer 146 and in the corresponding scaler for each memory; it then cycles the memories writing the scaler data into the memories. When the 16th clock pulse has occurred, all 16 new data values will have been written into memory in parallel for the three different colors. The settings of the most significant bit will then cause the Read/Write control bit to cycle back to the read mode. At this point, the Write operation has been completed for this acoustic pulse. At the next receive complete the Write cycle will be repeated again. The time necessary to write the 16 data values into the memories is, using this example, 1.6 micro seconds, or approximately so, whereby the delay time between acoustic pulse due to this factor is very short.

It will be appreciated that the preferred embodiment of the invention described herein is intended to be only an exemplary description of the principles of this invention. Modifications and changes in the described embodiment will occur to those skilled in the art, but such modifications and changes should be considered as being within the sprit and scope of the invention as defined by the dependent claims.

We claim:

1. A radiated energy pulse-echo imaging system with transducers for transmitting pulse for producing an image of a three-dimensional object in a display having at least two dimensions maintaining perspective, in which, at all ranges, the angular relationships of all targets on the object relative to the origin of the transducers are reproduced in the display, comprising:

an array of transducers for transmitting pulses toward the three-dimensional object and receiving corresponding echo data, means for steering said array in elevation and azimuthal directions to assume predetermined transmit and receive orientations relative to an initial array position, said array assuming a predetermined angular transmit orientation for each transmitted pulse and a plurality of predetermined angular receive orientations for each transmitted pulse, said array receive orientations being defined by angles formed in the elevation and azimuthal directions between said array in said initial position and said array in said receive orientations, processing means for receiving the echo data for each transmitted pulse from said array of transducers and for producing therefrom output signals indicating a plurality of image points having predetermined locations in the image to be displayed corresponding to the relative locations of those image points on the three-dimensional object, means for storing values of said echo data to produce a brightness control signal for each said image point, display means, and means for communicating said image point output signals and said brightness control signals to said display means and for locating said image point in said display means at a location directly related to said angles defining said array receive orientations, amplitude weighting means for varying the amplitudes of said image point output signals in relation to the distance from which said echo data are received, said weighted image point output signals being applied to z-axis drive means of said display means.

2. The imaging system of claim 1 wherein said array comprises a one-dimensional array of transducers.

3. The imaging system of claim 1 wherein said array comprises a two-dimensional array of transducers.

4. The imaging system of claim 2 wherein said array comprises a linear array of transducers.

5. The imaging system of claim 3 wherein said array comprises two orthogonally related linear arrays of transducers.

6. The imaging system of claim 1 wherein said receive array orientation defined by said angles are represented in said system by a trigonometric function of said angles.

7. The imaging system of claim 6 wherein said trigonometric function is the tangent of said angles.

8. The imaging system as defined in claim 6 wherein said trigonometric function is the sine of said angles.

9. The imaging system of claim 1 further comprising:

means for encoding said image point output signal with varying color data, said color data being varied in relation to the distance from which said received radiated energy signals are received, whereby said color data provides for range discrimination when visually displayed.

10. The imaging system of claim 1 wherein said means for storing includes a means for integrating said values.

* * * * *

UNITED STATES PATENT AND TRADEMARK OFFICE
CERTIFICATE OF CORRECTION

PATENT NO. : 4,694,434
DATED : September 15, 1987
INVENTOR(S) : Olaf von Ramm, Stephen W. Smith It is certified that error appears in the above-identified patent and that said Letters Patent is hereby corrected as shown below:

In Claim 1, line 2, "pulse" should be -- pulses --.

Signed and Sealed this

Fifth Day of January, 1988

Attest:

DONALD J. QUIGG

Attesting Officer

Commissioner of Patents and Trademarks